Patented May 29, 1951

2,554,955

UNITED STATES PATENT OFFICE 2,554,955

A PROCESS OF PRODUCING SUBSTANTIALLY UNIFORM PRODUCT FROM LECITHIN

Frederick F. Pollak, New York, N. Y., assignor to American Lecithin Company, Inc., Elmhurst, N. Y.

No Drawing. Application March 27, 1947,
Serial No. 737,708

8 Claims. (Cl. 260—410.7)

The invention relates to the discovery and production of novel products from lipoids and particularly from lecithin and from commercial lecithin.

The lipoids which are found in practically all vegetable and animal tissues and organs and which also form a component part of vegetable oils, such as soybean oil, belong to the group of phosphatides. They have a rather complicated constitution; if completely saponified they split into glycerine, fatty and oily acids, phosphoric acid and certain bases, mostly cholin and colamin or their derivatives.

Lecithin itself is to be considered as a cholinester having the formula:

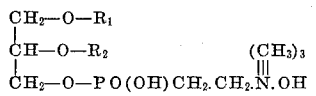

$R_1$ and $R_2$ are saturated or unsaturated fatty acid radicals.

Several lipoids are known which are differentiated from each other by the fact that a stearic radical may be replaced by a palmitin or oleic acid radical and cholin may be substituted partly or entirely by colamin or other amino bases.

However, the above mentioned lipoids which form the main component of the commercial lecithin also contain oil, sugar and several other impurities of an unknown composition which firmly adhere to the phosphatides; this may explain that it has hitherto not been successfully tried or has been considered impractical to obtain from the same uniform products, although it seems desirable to process the phosphatides with the purpose to derive from the same in a commercial manner products of a somewhat uniform composition. The term "uniform" used in the course of this specification is to denote products which if not being of an identical composition belong in the same chemical group and possess certain similar characteristic properties determining their practical use.

It is therefore the main purpose of this invention to recover from lipoids and particularly also from the commercial vegetable lecithin novel uniform products intended and adapted for specific practical uses.

It is another object of the invention to obtain by the processing of lipoids, oils which are entirely free from the nitrogen and phosphorus contents and the other impurities of the initial material.

It is also an object of the invention to produce from lipoids oils of a low specific gravity and viscosity and representing clear neutral colorless liquids which are easily soluble in organic solvents, such as alcohols, benzol, chloroform, acetone, petrolether and carbon-bisulfide.

It is a further object of the invention to derive from the processing of lipoids, oils which are emulsifiable with water.

With these and additional objects in view which will become apparent as this specification proceeds, the invention comprises in its broad aspect a modified or an incomplete decomposition of the lipoids and particularly also of the commercial lecithin with alkalialcoholate solutions; alkalimethylate solutions have proven to be of particular usefulness for the purpose of this invention.

The fact that a very satisfactory yield is obtained of nitrogen and phosphorus free oils at the termination of the treatment which oils according to analysis are not simple diglycerides indicates that the decomposition is based on a complicated reaction in which one molecule of fatty or oily acid is temporarily freed to enter as such or in a modified form into the diglyceride molecule which is left from the lipoid after splitting-off phosphoric acid and an amino base.

At the same time two byproducts are formed, which are

1. A sticky brown substance containing all the nitrogen and some phosphorus of the initial material, and 2. A solid which is free from nitrogen but contains phosphorus and actually consists of two different components.

The characteristic properties of the oil thus produced from lecithin are the boiling point at a 50 mm. vacuum of 239° C.; it is a clear colorless product of very low viscosity and a specific gravity of 0.885 at 20° C., soluble in alcohols, benzol, chloroform, acetone, petrolether and carbonbisulfide; it emulsifies slightly with water and solidifies at —2.5° C.; it can be entirely volatilized with steam. Its saponification number is 190, the acid number is about 12. On fundamental analysis the following composition was found: C=78.55 percent, hydrogen=11.88 percent. The formula calculated herefrom would be $C_{57}H_{104}O_5$.

Since this oil cannot be obtained from a lipoid molecule in a simple reaction without the cooperation of a group formed in a simultaneous reaction from other molecules it is apparent that the yield of oil will vary and depend upon the composition of the initial product and the working conditions.

When a lecithin is used which has been entirely freed from its oil contents, a smaller quantity of the novel oils will result than when using a commercial lecithin containing up to about 35% oil. Thus it has even been found useful to add lipoidfree oils of equal or different origin, thereby increasing the final output.

Several examples of carrying out the invention will now be described in the following:

*Example 1*

60 grams of an oilfree soybean lecithin are dissolved in 120 cubic centimeters of benzol. A solution is added of 2.59 grams of sodium metal in water-free methanol. The two solutions are mixed; they remain clear for a few seconds. Hereupon a paste forms.

The paste is heated with a reflux cooler on a water bath for about one hour. During this time a clear liquid and a solid dark brown sticky deposit is formed which adheres firmly to the flask, this sticky solid substance contains the nitrogen and a part of the phosphorous of the initial material.

After cooling the liquid is easily separable by pouring the same off the solid component. The liquid is evaporated or distilled to recover the solvents; a soft mass having a greasy consistence remains; it has an alkaline reaction, is insoluble in organic solvents but emulsifies easily with water resulting in well foaming solutions which are not precipitated by the admixture of weak acids such as acetic acid.

Four cubic centimeters of acetic acid are added to the above described soft greasy mass whereby the same becomes slightly acidified. The mass is now heated for about 30 minutes on the waterbath, cooled and extracted with acetone; the thus obtained solution is filtered, the solvent separated by distillation and recovered. The residue is the new oil having a brown color; the yield is 30 grams. It can be easily bleached and deodorized by customary bleaching agents or distilled in vacuo.

The filter residue from the acetone extraction is a soft solid substance of light brown color.

By means of a suitable solvent, such as for instance benzol or chloroform, it can be separated into two different components. The one is soluble in the solvent and may be used to produce well foaming solutions with water and other solvents.

The fundamental analysis of this product gave the following figures: Carbon=53.8 percent. Hydrogen=8.6 percent. Ash=13.8 percent.

The other component is insoluble in solvents, but swells up with benzol and chloroform. The fundamental analysis gave the following figures: Carbon=48.4 percent. Hydrogen=8.1 percent. Ash=23.0 percent.

Both these products contain phosphorus and no nitrogen; they are sodium salts of very weak acids and morsels of the lecithin molecule of unknown constitution.

They are always formed in the production of the new oils; but their quantity will depend upon the specific manner of processing the lecithin; their yield is in the case of the above described example 15.5 grams, whereas in accordance with the following Example 2 only half of this weight is obtained.

*Example 2*

60 grams of commercial vegetable lecithin consisting of about ⅓ part of soybean oil, about ⅓ part of lecithin and about ⅓ part of kephalin are processed as described in Example 1.

However, here the above described two byproducts are not isolated from the oil and the acetic acid is directly added to the acetone solution.

The mixture is heated for about 30 minutes on the water bath, distilled to recover the solvents, and the residue is now extracted with methyl-ethyl-ketone.

The solid substance is removed by filtering; the ketone is recovered by distillation. The residue is the new brownish oil; the yield is 37.5 grams which is better than in Example 1. The oil contains no soybean oil and is identical with the one produced according to Example 1.

*Example 3*

Instead of only commercial lecithin a mixture of the same is used with lecithin-free soya oil. The procedure is as follows:

60 grams of commercial lecithin and of 7.5 grams of lecithin-free soya oil are dissolved in 120 cubic centimeters of benzol. A solution of 2.85 grams of sodium in 65 cubic centimeters of methanol is added.

This mixture is heated on a water bath for one hour. 12.6 cubic centimeters of a 50% acetic acid are now added; the further procedure is the same as described above. The yield of the said oil is 51 grams and the yield of solid substances is 15 grams.

The sodium may be replaced by potassium metal; the yield in this case is slightly less and the weight of the solid byproducts is slightly higher.

*Example 4*

The sodium metal may be replaced by caustic soda or caustic potash without an essential change of the results; in this case 5 percent of the processing substance is used of the weight of the lecithin.

The yield is not as satisfactory as in the case of the previous three examples and the reaction products contain small quantities of free fatty acids; this result proves that the full success of the invention depends on the absence of even those traces of water which were formed by the reaction of the alkalihydrate with the methyl alcohol.

The invention has been described as a two step procedure the first step involving the treatment in an alkaline and the second step the treatment in an acid medium.

However, the invention may also be carried out as a one step process; in this case the work in the alkaline medium must be continued for a longer time and at least three times its duration to obtain the oil which may then be extracted after evaporation of the first used solvents with acetone; in this case the yield is less satisfactory.

The entire nitrogen of the initial material accumulates in the solid residue formed in the first phase of the process as a deposit which strongly adheres to the flask.

This byproduct of the invention is neatly entirely soluble in water and has a reducing action.

What I claim is:

1. In a method of producing essentially uniform products from lecithin and particularly commercial lecithin dissolving the lecithin in a hydrocarbon solvent, admixing thereto a solution of sodium in methanol whereby a paste is produced, heating said paste for about one hour with a reflux cooler until a solid sticky deposit, containing the nitrogen and a part of the phosphorus of the initial charge and a clear liquid results, separating said liquid from the said deposit, distilling-off the solvents, obtaining a greasy alkaline distillation residue, slightly acidifying the said residue, extracting the same with acetone and recovering from the acetone solution an essentially uniform phosphorus and nitrogen-free triglyceride oil and a soft solid substance which is free from nitrogen and contains the rest of the phosphorus of the initial charge.

2. In a method according to claim 1 using benzol as a solvent for the initial materials.

3. In a process according to claim 1 treating the phosphorus containing nitrogen-free solid substance which is obtained by the acetone extraction of the acidified residue with benzol and separating the same thereby into its two components, both being sodium salts of a weak acid, the one soluble and the other insoluble in the solvent.

4. In a process according to claim 1 treating the phosphorus containing nitrogen-free solid substance obtained by the acetone extraction of the acidified residue with chloroform into its two components both being of a weak acid nature, the one soluble and the other insoluble in the solvent.

5. In a process according to claim 1 using acetic acid to acidify the alkaline distillation residue.

6. In a method of processing commercial lecithin dissolving the initial substance in a hydrocarbon solvent, admixing to this solution a water-free alkali metal alcoholate solution resulting in the formation of a pasty product after a period of up to about one minute, heating the said product at water bath temperature for a period of about 30 to 60 minutes whereby a clear solution and a solid brown deposit is formed, separating the solution and recovering from the latter a phosphorous and nitrogen free glyceride oil.

7. In a method of processing commercial lecithin dissolving the initial substance in a hydrocarbon solvent, admixing to this solution a water-free alkali metal alcoholate solution resulting in the formation of a pasty product after a period of up to about one minute, heating the said product at water bath temperature for a period of about 30 to 60 minutes whereby a clear solution and a solid brown deposit is formed, separating the solution, removing the solvent, slightly acidifying the residue with a weak acid, heating the same for about 30 minutes on a water bath, extracting the same with a hydrocarbon solvent and recovering a phosphorous and nitrogen-free glycerin oil from said solution.

8. In a method of processing commercial lecithin dissolving the initial substance with benzol, admixing to the said solution a water-free sodium methylate solution resulting in the formation of a pasty product after a period of up to about one minute, heating the said product on the water bath for about one hour, whereby a clear liquid and solid brown deposit is formed, pouring-off the liquid, removing the solvent, slightly acidifying the residue with acetic acid, heating for about 30 minutes on the water bath extracting with acetone and recovering a phosphorous and nitrogen-free glyceride oil from the acetone solution.

FREDERICK F. POLLAK.

REFERENCES CITED

The following references are of record in the file of this patent:

UNITED STATES PATENTS

| Number | Name | Date |
|---|---|---|
| 1,895,424 | Rewald | Jan. 24, 1933 |
| 2,271,127 | Mattikow | Jan. 27, 1942 |
| 2,279,973 | Dietrich | Apr. 14, 1942 |

OTHER REFERENCES

Lecithin and Allied Substances, by Maclean, 1918 ed., page 17.